Aug. 9, 1932.  J. P. LANDRUM  1,871,124
VARIABLE PITCH PROPELLER
Original Filed Oct. 21, 1929
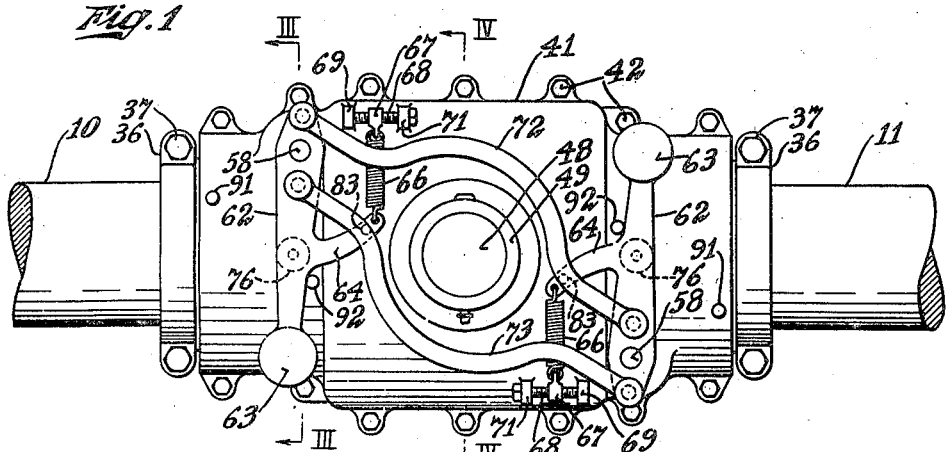
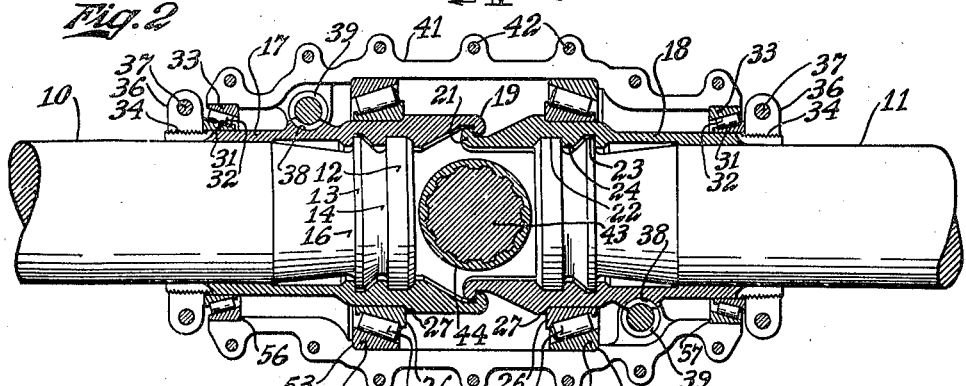
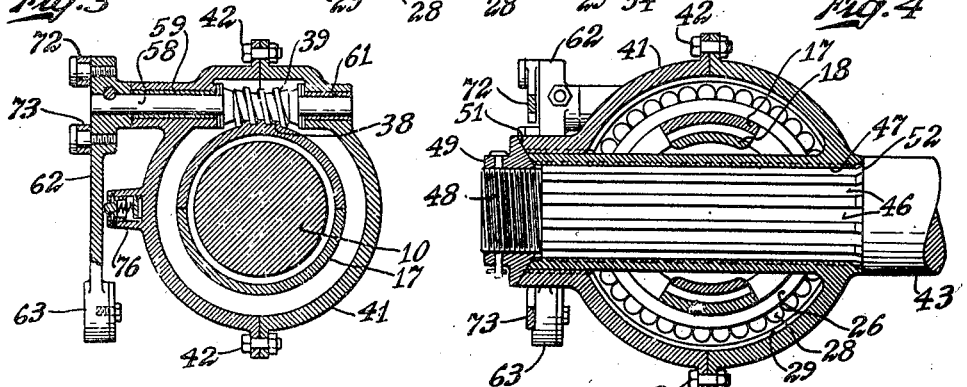
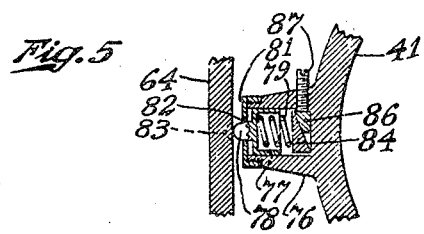
Inventor
John P. Landrum
By Johnston & Jennings
Attorneys

UNITED STATES PATENT OFFICE

JOHN P. LANDRUM, OF BIRMINGHAM, ALABAMA, ASSIGNOR OF ONE-HALF TO PERRY R. McCORMACK, OF BIRMINGHAM, ALABAMA

VARIABLE PITCH PROPELLER

Application filed October 21, 1929, Serial No. 401,212. Renewed May 20, 1932.

My invention relates to a means for varying the pitch of propeller blades, more particularly propellers employed with airplanes, and has for its object the provision of apparatus of the character designated which shall be simple and sturdy of design and effective to automatically vary the pitch of propeller blades in response to variations in centrifugal force developed in the propeller.

A further object of my invention is to provide an airplane propeller with suitable supporting bearings for the propeller blades whereby they may withstand the extremely high centrifugal force developed in the blades, together with means for automatically varying the pitch of the blades in response to variations in the centrifugal force developed.

A still further object of my invention is to provide an airplane propeller with an improved mounting for the blades, together with a worm gear mechanism movable in response to variations in centrifugal force developed in the propeller for altering the pitch of the propeller blades.

In the development of airplane design, it has been found that if a propeller be set with a pitch suitable to obtain the maximum efficiency during take off and climbing, when the translational velocity of the propeller is low, that such a pitch is entirely unsuited for flying level when the translational velocity is high. This, among other things, is due to the fact that the torque resistance of an airplane propeller with a given pitch decreases with its translational velocity. With an engine designed for maximum power at a given angular velocity with wide open throttle, a propeller pitch low enough to permit the engine to attain its most efficient angular velocity at take off and during climbing would have so low a torsional resistance when flying level at increased translational velocity that the engine would race beyond its most efficient angular velocity and not develop full power.

On the other hand, if an airplane propeller be given the proper pitch for developing full power at a given angular velocity when flying level with the translational velocity of the propeller relatively high, the torque resistance during take off would be so high that the most efficient angular velocity of the engine could not be attained and considerable power would be lost when most needed. It has accordingly been the practice heretofore to provide a compromise setting for airplane propellers which is neither ideal for taking off and climbing nor for level flying.

In attempting to solve this difficulty, means have heretofore been proposed for manual adjustment of the pitch of the propeller blades during flight and other means have been proposed for automatic adjustment thereof. In all such means, great difficulties have been encountered in providing a design capable of withstanding the extremely high centrifugal force developed in the propeller during flight which, with average propellers now in use, approximates twenty tons. Another difficulty encountered in the design of such apparatus is that of overcoming the friction obtained in the blade mounting due to the extremely high centrifugal forces attained, together with the ever present necessity in airplane design for providing low weight, reliability, freedom from wear, and operability at reasonable speeds, coupled with safety.

In accordance with my invention, I have provided an airplane propeller mounting means which overcomes the before mentioned difficulties, together with means whereby the pitch of the propeller blades is automatically varied in response to propeller speed. In accomplishing this result, the propeller is given a minimum pitch for take off and climbing, when the translational velocity of the propeller is low and the torsional resistance is high.

As the translational velocity of the propeller increases, diminishing the torque resistance, its angular velocity increases and weights, moving in response to the increased centrifugal force developed, operate through a worm gear mechanism to automatically increase the pitch of the propeller blades. The mounting for the blades is made particularly sturdy to insure safety and withstand the forces set up, while at the same time frictional resistance is largely overcome.

Another feature of my invention is the provision of a yieldable latch means which holds the propeller pitch constant, once it has attained its maximum pitch setting, within desirable variations in angular speed. By means of this feature the pilot may throttle his engine down to save fuel when flying level so that the engine runs at a slower angular velocity, and still maintain the maximum pitch setting of the blades.

Apparatus embodying features of my invention is illustrated in the accompanying drawing forming a part of this application, in which Fig. 1 is a front elevational view of a propeller blade mounting constructed in accordance with my invention;

Fig. 2 is a longitudinal sectional view of the apparatus;

Fig. 3 is a transverse sectional view taken along the line III—III of Fig. 1;

Fig. 4 is a sectional view taken along the line IV—IV of Fig. 1; and

Fig. 5 is a detailed sectional view showing the yielding latch means for holding the propeller blades at their maximum pitch when once attained.

Referring to the drawing for a better understanding of my invention, I show a pair of diametrically opposed propeller blades 10 and 11. Each of the propeller blades is provided with a root having shoulders 12 and 13 and grooves 14 and 16 to serve as fastening elements for holding the blades in place. The blades illustrated are of the conventional metal blade design, but it will be apparent that blades of any accepted type may be mounted to operate in accordance with my invention.

Surrounding the roots of the blades 10 and 11 are a pair of split sleeves 17 and 18. The sleeve 17 is provided at its inner end with hook members 19 which hook over complementary hook members 21 formed on the inner end of the sleeve 18. Ordinarily there is little or no bearing on these hook members, but they are provided as a safety means in case of the weakening or failure of thrust bearings to be described later.

Each of the sleeves 17 and 18 is provided with grooves 22 and 23 with an intervening shoulder 24, which grooves and shoulder are complementary to the shoulders and grooves at the roots of the blades. Surrounding each of the sleeves, opposite the groove and shoulders, is a roller bearing race 26 which is pressed on the sleeve to firmly engage it with the blade root. The roller bearing race 26 bears against a shoulder 27 formed on each of the sleeves. It will be noted that the race 26 is designed to take the outward thrust of the propeller and cooperates with the roller bearing members 28 and an outer race 29.

At the outer end of each of the sleeves, a roller bearing race 31 is pressed on over the sleeves and cooperates with roller bearing members 32 and an outer race 33 to withstand the flexure strain on the propeller blades. The outer end of each of the sleeves is also threaded at 34 to receive a split clamp member 36 having mating threads and which is screwed onto the outer end of the sleeve tightly against the race 31 to take up any slack in the bearings and when tight, is securely clamped to the sleeve by means of bolts 37.

Intermediate the ends of each of the sleeves there is formed on the outer surface thereof a segmental worm gear 38 which cooperates with a worm 39 and by means of which angular motion may be imparted to the blades through the sleeves. In order to prevent vibration and to minimize wear on the teeth, the worm 39 is designed as shown to have a maximum bearing on the gear teeth.

Surrounding the sleeves 17 and 18 is a divided housing 41, the halves of the housing being held together by bolts 42. At 43 is shown the propeller shaft which extends transversely through the housing 41, a sleeve 44 being formed in the housing and surrounding the shaft. The shaft 43 is provided with grooves 46 and the sleeve 44 is provided with teeth 47 fitting in the grooves so that the housing is rotatable with the shaft. The outer end of the shaft is provided with a reduced threaded portion 48 adapted to receive a beveled nut 49 which bears against a correspondingly beveled portion 51 of the housing. The propeller shaft 43 is provided with a shoulder 52 at the end of the grooves 46 so that when the nut 49 is tightened up the housing is firmly secured to the shaft.

The housing 41 is formed to provide annular shoulders 53 and 54 against which the outer races 29 for the roller thrust bearing members 28 bear. The housing is also provided with annular shoulders 56 and 57 against which the outer races for the roller bearing members 32 bear. When the nuts 42 are tightened up, the housing fits tightly around the roller bearing races so as to form an extremely sturdy construction. It will be seen that with the blades 10 and 11 mounted in the sleeves 17 and 18 and with the roller bearings interposed between these sleeves and the housing 41, that the blades are permitted a limited angular motion around their long axes to change their pitch.

Each of the worms 39 heretofore described, is carried by a shaft 58 mounted in bearings 59 and 61 formed in the housing 41. Secured to the outer end of the shaft 58 of each of the worms 39 is a weight arm 62 carrying a weight 63 on its outer end. Each of the weight arms 62 is provided with a lateral arcuate spring anchor 64 to which is attached a spring 66. The opposite end of the spring 66 is secured to a nut 67 threaded onto an adjustment screw 68 carried in brackets 69 and 71 formed on the housing 41. By turning the adjustment screw 68 the position of the nut 67 may be changed, thus changing the tension on the spring 66. In order that the two weight arms shall move in unison, I connect them by links 72 and 73.

Another important feature of my invention is the provision of yielding means for holding the weight arms 62 in their maximum outward position due to centrifugal force when once attained, for an appreciable decrease in angular velocity of the propeller. In order to accomplish this, I provide a boss 76 on each side of the housing 41 opposite the weight arm 62 and in front of which the arcuate spring anchor 64 swings during the outward movement of the arm. The boss 76 is made hollow to receive a latch member 77 having a rounded head 78. The latch member 77 is pressed outwardly by means of a spring 79 and its outward movement is limited by means of a cover 81 screwed onto the boss 76 and provided with a central aperture 82 through which the rounded latch member 78 protrudes. Each of the spring anchors 64 is provided near its outer end with a recess 83 into which the latch member 78 is forced by the spring 79 when the weight arm has attained its outermost position.

The tension of the spring 79 may be varied by means of cooperating wedge members 84 and 86 positioned in the bottom of the recess in the boss and operated by means of a screw 87 extending through the side of the boss and bearing against the wedge member 86. In order that the weight arms 62 shall have a definite limited movement, I provide stops 91 and 92 on the casing. When the weight arms 62 reach their outward limit of movement against the stops 91, the recess 83 is opposite the latch member 78.

From the foregoing description of my improved apparatus, its operation will become readily apparent. The blades 10 and 11 are first mounted in the sleeves 17 and 18 and are given the proper initial pitch for taking off and climbing when the translational velocity of the propeller is low. The springs 66 are given an initial loading of such an amount that there is preferably no movement of the weight arms 62 until the angular velocity of the propeller has reached, say, within 50 R. P. M. of the most efficient speed of the engine with wide open throttle. When the engine has attained the necessary speed, the arms 62 move outwardly, turning the worms 39 so as to rotate the sleeves 17 and 18 and increase the pitch of the propeller blades. When the engine has attained its most efficient velocity, the springs 66 are so designed that the arms 62 reach their outer limit of movement against the stops 91 and the yielding latch members 78 drop into the recesses 83 of the spring anchors. The springs 79 are so adjusted that the weight arms are held in their outermost position until there has been a definite decrease in angular velocity of the propeller, say around 300 to 400 R. P. M. less than the most efficient speed of the engine with wide open throttle. This permits the pilot to throttle the engine down when flying level to save fuel and still maintain the maximum pitch of the propeller blades. When the speed of the engine has been reduced below that at which the weight arms are released, the blades return at once to their minimum pitch setting permitting landing at slower ground speed. As before pointed out, the limits of speeds at which the arms 62 start to move outwards and at which the latches 78 are released from the recesses 83 may be varied to suit operating conditions or the particular design of the airplane by adjusting the tension of the springs 66 and 79.

From the foregoing it will be apparent that I have devised an improved mounting for propeller blades which is extremely sturdy and reliable and by means of which the pitch of the blades may be readily varied and this variation accomplished by means responsive to centrifugal force developed in the propeller.

While I have shown my invention in but one form, it will be obvious to those skilled in the art that it is not so limited, but is susceptible of various changes and modifications without departing from the spirit thereof, and I desire therefore that only such limitations shall be placed thereupon as are imposed by the prior art or as are specifically set forth in the appended claims.

What I claim is:

1. In an airplane propeller, a propeller shaft, a housing rotatable with the shaft, a pair of blade supporting sleeves rotatable within the housing, thrust bearing means between the sleeves and the housing, a pair of blades securely mounted in the sleeves, a worm for rotating each of the sleeves in the housing to vary the pitch of the blades, a spring biased weight arm fixedly secured to each of the worms and effective in response to angular velocity of the propeller to rotate said worms, and means for effecting operation of said weight arms in unison.

2. In an airplane propeller, a pair of propeller blades, means responsive to angular velocity of the propeller for varying the pitch of the propeller blades, means for limiting the pitch attainable in response to angular velocity to a predetermined maximum, and a yieldable latch means for holding the blades at their maximum pitch when once attained and adapted to release same automatically upon an appreciable decrease in angular velocity of the propeller.

3. In an airplane propeller, a pair of propeller blades, mounting means for the blades, interconnected biased weight arms movable relative to a part of the mounting means operatively connected to the blades to vary their pitch in response to angular velocity of the propeller, means to limit the pitch attainable in response to angular velocity to a predetermined maximum, and yielding latch means cooperating between the weight arms and the mounting means for holding the blades at their maximum pitch when once attained and adapted to release same automatically upon an appreciable decrease in angular velocity of the propeller.

4. In an airplane propeller, a pair of propeller blades, mounting means for the blades, interconnected biased weight arms movable relative to a part of the mounting means operatively connected to the blades to vary their pitch in response to angular velocity of the propeller, means to limit the pitch attainable in response to angular velocity to a predetermined maximum, yielding latch means cooperating between the weight arms and the mounting means for holding the blades at their maximum pitch when once attained and adapted to release same automatically upon an appreciable decrease in angular velocity of the propeller, and means for adjusting the yielding latch means.

5. In an airplane propeller, a propeller shaft, a housing rotatable with the shaft, a pair of divided sleeves diametrically opposed in the housing, a pair of propeller blades mounted in the sleeves, means for securing the sleeves to the blades in predetermined angular relation, thrust bearing means between the sleeves and the housing, a worm gear carried by each sleeve, a worm meshing with each worm gear and carried by the housing, and a spring biased weight arm fixedly secured to each worm and movable outward and inward responsive to variations in angular velocity of the propeller to operate the worm.

6. In an airplane propeller, a propeller shaft, a housing rotatable with the shaft, a pair of divided sleeves diametrically opposed in the housing, a pair of propeller blades mounted in the sleeves, means for securing the sleeves to the blades in predetermined angular relation, thrust bearing means between the sleeves and the housing, a worm gear carried by each sleeve, a worm meshing with each worm gear and carried by the housing, a spring biased weight arm fixedly secured to each worm and movable outward and inward responsive to variations in angular velocity of the propeller to operate the worm, and means connecting the two weight arms to effect their movement in unison in response to angular velocity of the propeller.

7. In an airplane propeller, a propeller shaft, a housing rotatable with the shaft, a pair of divided sleeves diametrically opposed in the housing, a pair of propeller blades mounted in the sleeves, means for securing the sleeves to the blades in predetermined angular relation, thrust bearing means between the sleeves and the housing, a worm gear carried by each sleeve, a worm meshing with each worm gear and carried by the housing, a spring biased weight arm connected to each worm and movable outward and inward responsive to variations in angular velocity of the propeller to operate the worm, means connecting the two weight arms to effect their movement in unison in response to angular velocity of the propeller, means for limiting outward movement of the weight arms to a predetermined maximum, and yieldable means to hold the weight arms at their maximum outward position, when once attained, for an appreciable decrease in angular velocity of the propeller.

8. In an airplane propeller, a propeller shaft, a housing rotatable with the shaft, a pair of divided sleeves diametrically opposed in the housing a pair of propeller blades mounted in the sleeves, means for securing the sleeves to the blades in predetermined angular relation, thrust bearing means between the sleeves and the housing, a worm gear carried by each sleeve, a worm meshing with each worm gear and carried by the housing, a spring biased weight arm connected to each worm and movable outward and inward responsive to variations in angular velocity of the propeller to operate the worm, means connecting the two weight arms to effect their movement in unison in response to angular velocity of the propeller, means for limiting outward movement of the weight arms to a predetermined maximum, an element fixed with the housing and positioned adjacent to each weight arm, and a yielding latch means cooperating between the element and the weight arm and so disposed as to become engaged when the weight arm has attained its maximum outward position.

9. In an airplane propeller, a propeller shaft, a housing rotatable with the shaft, a pair of divided sleeves diametrically opposed in the housing, a pair of propeller blades mounted in the sleeves, means for securing the sleeves to the blades in predetermined angular relation, thrust bearing means between the sleeves and the housing, a worm gear carried by each sleeve, a worm meshing with each worm gear and carried by the housing, a spring biased weight arm connected to each worm and movable outward and inward responsive to variations in angular velocity of the propeller to operate the worm, means connecting the two weight arms to effect their movement in unison in response to angular velocity of the propeller, means for limiting outward movement of the weight arms to a predetermined maximum, an element fixed with the housing and positioned adjacent to each weight arm, and a pair of rounded spring pressed latch members carried by the housing and positioned to bear against the weight arms, there being a recess in each of the weight arms in which the latch member falls when the weight arm has attained its maximum outward movement.

10. In an airplane propeller, a pair of diametrically opposed blades having roots provided with grooves and shoulders, a pair of split sleeves surrounding the blade roots and having complementary grooves and shoulders, means for clamping the sleeves to the blade roots, interlocking hook means on the inner ends of the sleeves, a propeller shaft extending transversely of the sleeves between the interlocking hook means, a housing between the interlocking hook means, a housing for the sleeves rotatable with the propeller, roller thrust bearing means between the housing and the sleeves, and means responsive to centrifugal force developed in the propeller for rotating the sleeves with the blades in the housing.

11. In an airplane propeller, a pair of diametrically opposed blades having roots provided with grooves and shoulders, a pair of split sleeves surrounding the blade roots and having complementary grooves and shoulders, means for clamping the sleeves to the blade roots, interlocking hook means on the inner ends of the sleeves, a propeller shaft extending transversely of the sleeves between the interlocking hook means, a housing for the sleeves rotatable with the propeller, roller thrust bearing means between the housing and the sleeves, a worm gear carried by each of the sleeves, a worm cooperating with each of the gears and caried by the housing, a spring pressed weight arm for operating each of the worms in response to centrifugal force, and link means for effecting movement in unison of the weight arms.

12. In an airplane propeller, a propeller shaft, a housing rotatable with the shaft, a pair of blade supporting sleeves rotatable within the housing, thrust bearing means between the sleeves and the housing, a pair of blades securely mounted in the sleeves, a blade operating shaft journalled in each of the housings and adapted to cooperate with the sleeve to vary the pitch of the blades, a spring biased weight arm fixedly secured to each shaft, and means for effecting operation of the weight arms in unison.

13. In a variable pitch propeller comprising a hub having a plurality of blades rotatably mounted therein for rotation about their longitudinal axes, gear means secured to the inner end of each blade within said hub, a worm shaft meshing with each of said gear means, each worm shaft being rotatably mounted in said hub and having a portion projecting laterally therefrom, a weighted member secured to each projecting portion and adapted to be moved under the action of centrifugal force to effect rotation of the worm shaft, gear means and blade associated therewith in a direction to increase the pitch of said blade, and releasable means for locking the weighted members in a predetermined position.

14. A variable pitch propeller comprising a hub having a plurality of blades rotatably mounted therein, a gear secured to the inner end of each of said blades within the hub, a worm shaft continuously meshing with each of said gears, each of said worm shafts being rotatably mounted in said hub, a weighted member secured to each of said worm shafts and adapted to be moved in response to centrifugal force to automatically vary the pitch of the blades, and releasable latch means resiliently actuated in one direction for locking the weighted members in one position.

15. A variable pitch propeller having a rotatable shaft, a hub drivably connected to said shaft, a plurality of propeller blades rotatably mounted in said hub, and means for automatically varying the pitch of said blades during operation of the propeller, said means comprising a gear drivably connected with the inner ends of each of said propeller blades, a worm meshing with each of said gears and rotatably mounted in said hub, a weighted member secured to each of said worms and movable in response to centrifugal force for varying the pitch of said blades, resilient means interconnected between said weighted members and said hub for yieldingly opposing movement of said weighted members in response to centrifugal force, means on said hub for positively limiting movement of said weighted members in one direction and releasable latch means for locking the weighted members when said members have moved a substantial distance in the opposite direction.

16. A variable pitch propeller having a rotatable shaft, a hub drivably connected with said shaft, a plurality of propeller blades rotatably mounted in said hub, and means for rotatably adjusting said blades for varying the pitch thereof during rotation of the shaft, said means comprising centrifugally-responsive members operatively connected with each of said blades, resilient means for yieldably opposing movement of said members in response to centrifugal force, and releasable latch means for positively locking said members in one position.

17. A variable pitch propeller having a rotatable shaft, a hub drivably connected with said shaft, a plurality of propeller blades rotatably mounted in said hub, and means for rotatably adjusting said blades to vary the pitch thereof, said means comprising weighted members movable in response to centrifugal force, means for connecting said members and blades, resilient means for yieldably opposing movement of said members in response to centrifugal force, and self-adjusting releasable latch devices for positively latching said members in one position of adjustment, said devices being resiliently actuated into latching position.

18. In a variable pitch propeller having a plurality of blades, means for automatically varying the pitch of said blades during operation of the propeller, and means including a self-adjusting releasable latch mechanism automatically operable at a predetermined speed of rotation of the propeller for preventing further movement of said pitch varying means.

19. In a variable pitch propeller having a plurality of blades, means for automatically varying the pitch of said blades during operation of the propeller, and means for preventing further movement of said pitch changing means at a predetermined speed of rotation of the propeller, said means including a plurality of releasable latch devices, said devices being resiliently actuated in one direction.

In testimony whereof I affix my signature.

JOHN P. LANDRUM.